United States Patent
Schulz et al.

(10) Patent No.: US 6,786,618 B2
(45) Date of Patent: Sep. 7, 2004

(54) LIGHT FOR AN AIRCRAFT

(75) Inventors: Rico Schulz, Rixbeck (DE); Sascha Lueder, Mastholte (DE); Bernd Ganzer, Erwitte (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 0 days.

(21) Appl. No.: 10/162,881

(22) Filed: Jun. 6, 2002

(65) Prior Publication Data

US 2003/0072165 A1 Apr. 17, 2003

Related U.S. Application Data

(60) Provisional application No. 60/365,541, filed on Mar. 20, 2002.

(30) Foreign Application Priority Data

Jun. 6, 2001 (DE) .......................... 101 27 305

(51) Int. Cl.⁷ ................................. F21V 7/00
(52) U.S. Cl. ...................... 362/247; 362/470; 362/517; 362/544; 362/241
(58) Field of Search ................................. 362/301, 302, 362/303, 470, 517, 544, 241, 518, 346, 297

(56) References Cited

U.S. PATENT DOCUMENTS

| | | |
|---|---|---|
| 2,058,977 A | 6/1936 | Grimes |
| 2,960,679 A | 11/1960 | Atkins |
| 5,931,569 A | 8/1999 | Anderson |
| 6,474,852 B1 * | 11/2002 | Ohkohdo et al. ........... 362/487 |
| 2001/0026452 A1 | 10/2001 | Ganzer et al. |

FOREIGN PATENT DOCUMENTS

| | | |
|---|---|---|
| EP | 1 138 593 A1 | 10/2001 |
| GB | 2 337 645 A | 11/1999 |

* cited by examiner

*Primary Examiner*—Alan Cariaso
*Assistant Examiner*—Guiyoung Lee
(74) *Attorney, Agent, or Firm*—Birch, Stewart, Kolasch & Birch, LLP (57) ABSTRACT

An aircraft position light for an aircraft is provided with a luminous device for emitting light and a reflector arrangement. The luminous device comprises a first and a second light source, which emit light within a light radiation solid angle, the two light sources being arranged symmetrically to the preferential axis and central axes of the light radiation solid angles being inclined so as to face each other. The reflector arrangement comprises a first and a second reflection surface allocated to the first and second light source, respectively. The first reflection surface is arranged opposite to the first light source and the second reflection surface is arranged opposite to the second light source.

18 Claims, 6 Drawing Sheets

LIGHT FOR AN AIRCRAFT

This nonprovisional application claims priority under 35 U.S.C. §119(a) on Patent Application No. 101 27 305.3, filed in Germany on Jun. 6, 2001, and Provisional Application No. 60/365,541, filed in the U.S. on Mar. 20, 2002, both of which are herein incorporated by reference.

BACKGROUND OF THE INVENTION

1. Field of the Invention

The present invention relates to a light for an aircraft with a housing, comprising a light source and a reflector forming a bundle of light of the light emitted by the light source for generating a predetermined light distribution, and with a translucent cover for closing the housing.

2. Description of the Background Art

It is common to equip lights with incandescent lamps and a reflector to generate, as a position light, for example, a desired luminous intensity distribution (e.g., German Patent 41 17 289). In aircraft, it is known that for lights arranged on exposed positions of the aircraft, e.g., at the free ends of the wing or in a rear portion of the craft, different luminous intensity distributions in vertical and horizontal directions are predetermined. From the advertising documents of the company Hella KG Hueck & Co. "HELLA Aircraft Equipment", a light (No. 2LA 001 625-xx) is known which satisfies a predetermined horizontal luminous intensity distribution in a range between +/−70°. The light comprises a housing wherein as a light source, an incandescent lamp is arranged coaxially with the housing. The incandescent lamp is arranged in a rotationally symmetrically configured reflector reflecting the light emitted by the incandescent lamp according to the predetermined light distribution. A front edge of the housing serves as a boundary edge for the emitted light bundle. A disadvantage of the known light is that the luminous intensity of the incandescent lamp has to be designed for being relatively high to satisfy the requirements as to the predetermined luminous intensity distribution. As a consequence, the minimum luminous intensity in some parts of the predetermined solid angle range of light radiation has to be exceeded by far so that the luminous intensity in other parts of the solid angle range of light radiation is barely above the minimum luminous intensity valid for these parts.

SUMMARY OF THE INVENTION

It is therefore an object of the present invention to provide a light for an aircraft in such a manner that it is ensured to achieve a predetermined luminous intensity distribution with an increased efficiency.

To solve this object, the present invention provides a light, particularly a position light, for an aircraft, preferably for being mounted to the rear end of an aircraft, such as, e.g., an airplane, which is provided with a luminous device for emitting light, a reflector arrangement, and a housing comprising a receiving room for the luminous device and the reflector arrangement covered by a transparent cover, which are configured such that light, with a minimum intensity required along a preferential axis, emerges from the housing.

According to the invention, this light is characterized in that the luminous device includes a first and a second light source which are substantially identical and respectively emit light within a light radiation solid angle with a central axis, the two light sources are arranged symmetrically to the preferential axis and the central axes of the light radiation solid angle is inclined so as to face each other. The reflector arrangement includes a first and a second reflection surface allocated to the first and second light source, respectively, the reflection surfaces also being symmetrically arranged to the preferential axis and respectively provided with a light propagation limiting edge for limiting the light propagation range, within which light emitted directly by the respectively allocated light source emerges from the receiving room of the housing. The first reflection surface is arranged opposite to the first light source and the second reflection surface is arranged opposite to the second light source. The light propagation limiting edge of the first reflection surface faces away from the second light source and the light propagation limiting edge of the second reflection surface faces away from the first light source. The two reflection surfaces are oriented and/or configured such that light emitted by the one light source is reflected by the reflection surface allocated thereto past the light propagation limiting edge of the other reflection surface to increase the luminous intensity within the light propagation range of the other light source near the partial range defined by the light propagation limiting edge of the one reflection surface.

In the light according to the invention, the use of appropriately arranged reflection surfaces (as is indicated above) achieves that the requirements, particularly with respect to the light/dark border of light distribution functions, can be satisfied while using as few light sources as possible. This is particularly possible when LED elements or LED modules are used as light sources. The advantage of LED elements compared with conventional incandescent lamps (with spiral-wound filament or configured as flashtube) is that LED elements have a substantially longer service life. Moreover, LED elements are substantially less sensitive to interferences. Moreover, LED elements can be operated in a substantially smaller and lower voltage range than conventional incandescent lamps. Finally, the power consumption of LED elements is substantially lower than that of incandescent lamps. All this leads to advantages in technical and particularly also in economical regard, therefore, the aircraft industry and aviation companies are increasingly interested in the use of LED technique in the exterior lighting area of aircraft.

It has to be pointed out in this context, however, that the invention is not limited to LED elements as light sources but that conventional incandescent lamps can also be used as light sources or luminous device.

A certain disadvantage of LED elements is only their limited radiation angle range of from 120° to 180° (depending on the type). Therefore, it is required that the legal or international requirements in aviation as to the horizontal and vertical luminous intensity distributions of position lights on airplanes are satisfied in spite of this relatively limited solid angle radiation range by appropriately arranged reflection surfaces.

In a further embodiment of the invention, the reflector arrangement includes a third and a fourth reflection surface which are allocated to the first and second light source, respectively, and are also arranged symmetrically to the preferential axis and between the first and the second reflection surface when seen in a top view of the cover in the direction of the preferential axis and reflect the light emitted by the respectively allocated light source substantially in the direction of the preferential axis.

Suitably, the reflector arrangement has a fifth and a sixth reflection surface also arranged symmetrically to the preferential axis and offset by 90° with respect to the first and the second reflection surface, the fifth and the sixth reflection surface reflecting the light emitted by both light sources within a first solid angle range adjacent to the preferential axis. Suitably, the fifth and sixth reflection surfaces interconnect the first and second reflection surfaces.

In further embodiment of the invention, it is further provided that the reflector arrangement includes four seventh reflection surfaces which are diametrically opposed to each other in pairs and are arranged symmetrically to the preferential axis in pairs, that two seventh reflection surfaces are allocated to one light source, respectively, and that the four seventh reflection surfaces reflect light of the light sources respectively allocated thereto within a second solid angle range spaced from the preferential axis. Particularly, the first solid angle range is located between the preferential axis and the second solid angle range.

Particularly, the third and fourth reflection surfaces as well as the four seventh reflection surfaces are configured as parts of the surface of a common first reflector body, which, in top view of the cover of the housing, viewed in the direction of the preferential axis, is arranged between the two light sources. It is also advantageous if the first, the second, the fifth and the sixth reflection surface are configured as a second annular reflector body, which, in top view of the cover of the housing, viewed in the direction of the preferential axis, is arranged in front of the two light sources.

In a further embodiment of the invention, in a top view of the cover of the housing, viewed in the direction of the preferential axis, the light sources are arranged behind the second reflector body and in front of the first reflector body.

Preferably, the reflection surfaces have a curved, particularly concavely curved configuration.

In a further embodiment of the invention, each of the two light sources is configured as a light source comprising at least one LED element, each light source being particularly configured as an LED module with a plurality of LED elements arranged in the form of a matrix or a lattice.

Further, for the illumination in directions of 90° to the preferential axis, it is suitable to provide further light sources arranged in such a manner that they emit their light under an angle of substantially 90° to the preferential axis, these further light sources include at least one LED element each.

For the identification friend-foe it is suitable when additional radiation sources emitting electromagnetic radiation in the non-visible wavelength range are provided and arranged in such a manner that they emit their radiation substantially in the direction of the preferential axis, these radiation sources being adapted to be driven to supply the radiation pulsatingly, intermittently and/or continuously. Preferably, these additional radiation sources are configured as LED element, particularly as IR-LED element.

To solve the above object, a light is provided according to a modification of the invention which is provided with a housing containing a luminous device and a reflector arrangement forming a bundle of light of the light emitted by the luminous device for generating a predetermined light distribution within a predetermined solid angle range with a preferential axis, and a transparent cover locking the housing.

This light has a reflector arrangement that includes several reflection surfaces which are differently oriented and arranged next to the luminous device so as to be transversely offset with respect to the preferential axis, the luminous device being positioned obliquely relative to the preferential axis.

The particular advantage of the light according to the invention is that by the configuration of differently oriented reflection surfaces, the light emitted by the light source can be specifically led to the generation of a predetermined luminous intensity distribution. Thus, the standardized photometric requirements can be satisfied with relatively small efforts. The basic thought of the invention is to achieve a desired minimum luminous intensity distribution in a predetermined solid angle range by differently oriented reflector surfaces under energetically optimized conditions and particularly by the use of LEDs or LED modules. Due to the fact that reflection surfaces are positioned in an arrangement transversely offset with respect to the main radiation direction (preferential axis) of the light, a large solid angle range can be covered by the light beams emitted by the light source arranged obliquely to the main radiation direction. Thus, the light beam can be deflected in a large angular range without the reflection surfaces having an undesired shading effect.

According to a particular embodiment, the reflector has a first (inner) and a second (outer) reflector body or segment, each of which has a number of differently oriented reflection surfaces. The outer reflector segment includes at least two reflection surfaces to generate a broad light distribution section with relatively high light intensity. The inner reflector segment includes small reflection surfaces, which may be configured independently of the orientation of the reflection surfaces of the outer reflector segment. The inner and outer reflector segments can either be integrally connected to each other or they can be configured as separate components. It is essential that the structural shapes of the reflection surfaces of the inner reflector segment on the one hand and the outer reflector segment on the other hand can be configured independently of each other. The only condition is that the reflection surfaces of the inner reflector segment do not project so far as to shade the reflector segments of the outer reflector segment arranged on that side of the inner reflector segment facing away from the light source.

As an alternative, the reflector segments can be arranged terrace-shaped at a different distance from the light source The reflector segments that are further away from the light source being constructed so as to be higher in the main radiation direction of the light.

According to a further aspect of the invention, the light includes light sources that are arranged obliquely under an acute angle to the main radiation direction thereof, the reflection surfaces of the outer reflector segment functioning so as to reflect the light beams emitted by the first and the second light sources, respectively. The reflection surfaces of the inner reflector segment each serve only to reflect the light beams either of the first light source or of the second light source.

According to a further aspect of the invention, the light sources as well as the reflection surfaces of the outer and the inner reflector segments are arranged symmetrically to a central plane of the light. Thus, a particular simple structure of the light is possible. As an alternative, it is also possible to arrange more than two light sources, e.g., under an angle of 120° or 90°, in a circumferential direction to the main radiation direction.

By providing several light sources, a redundancy can be created which prevents an absolute operative failure of the light.

According to a preferred embodiment, the light sources are configured as LED modules (light-emitting diode modules), each of which has a plurality of light-emitting diodes arranged in the form of a lattice on a carrier plate. By the use of light-emitting diodes, the power consumption can be decreased and the life expectancy can be substantially increased, respectively. By a failure of the light-emitting diodes, a spectrum can be realized in particular which spares a wavelength range interfering with the operation of a night viewer. It is not necessary to provide a filter glass and thus, an additional night view filter is not required.

According to a further aspect of the invention, the inner reflector segment comprises at least one opening for the passage of light beams of a further radiation source, preferably a radiation in the invisible wavelength range, e.g., of an infrared light source. Through appropriate drive, the infrared light source is suitable for transmitting optical identification signal patterns for the identification friend-foe for military purposes.

In connection with the two modifications described above and the developments thereof, reference was made to a plurality of features and feature combinations. It has to be noted that features described in connection with the one modification of the invention may also be used with another modification. In this respect, the invention covers all combinations of the features described before.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
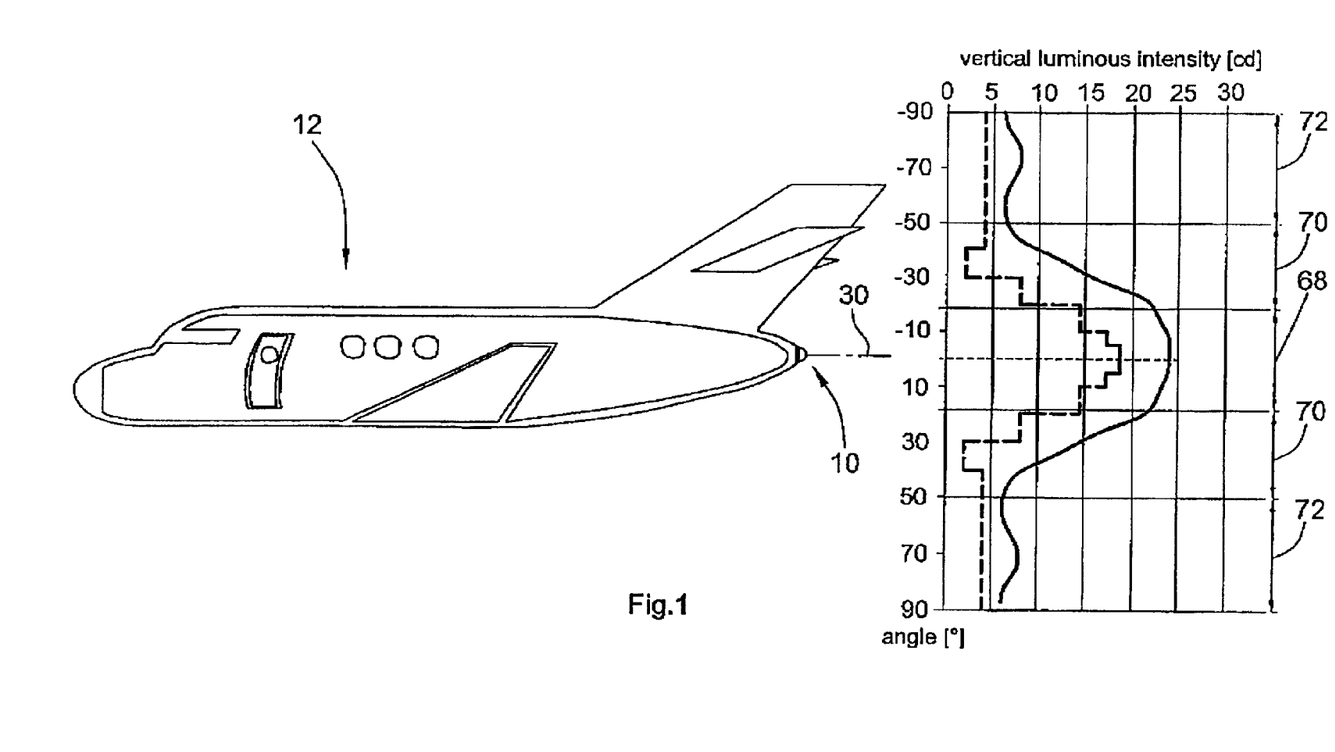
FIG. 1 is a side view of an airplane with a position light arranged at a rear end and a diagram in which the dotted line shows a required (minimum) luminous intensity distribution in a vertical direction and the continuous line shows the actually measured vertical light distribution of the position light.
Figure 2:
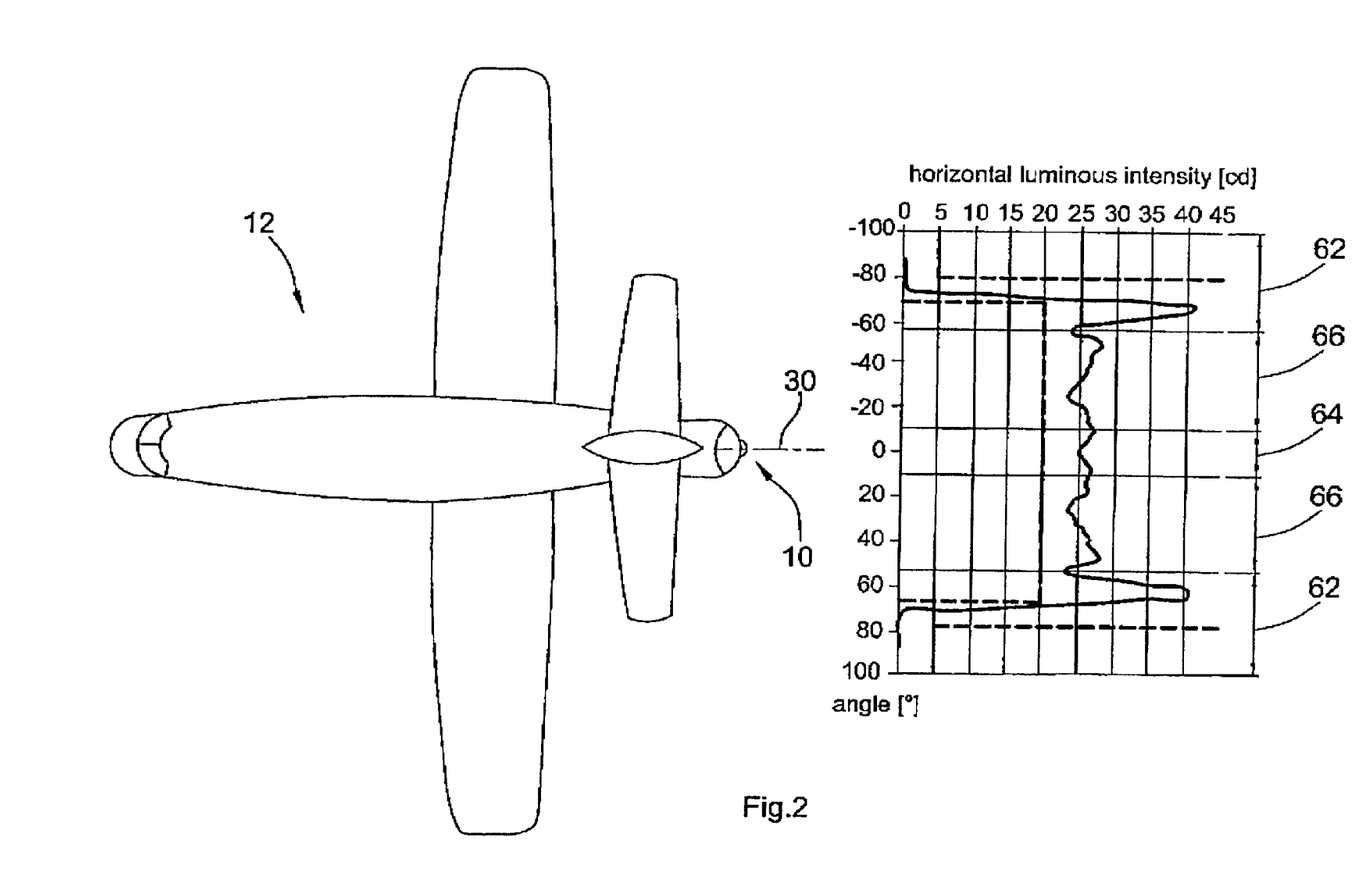
FIG. 2 is a top view of the airplane according to FIG. 1 with a position light arranged at the rear end and a diagram in which the dotted lines show the allowed range for the horizontal light distribution and the continuous line shows the horizontal light distribution of the position light.
Figure 3:
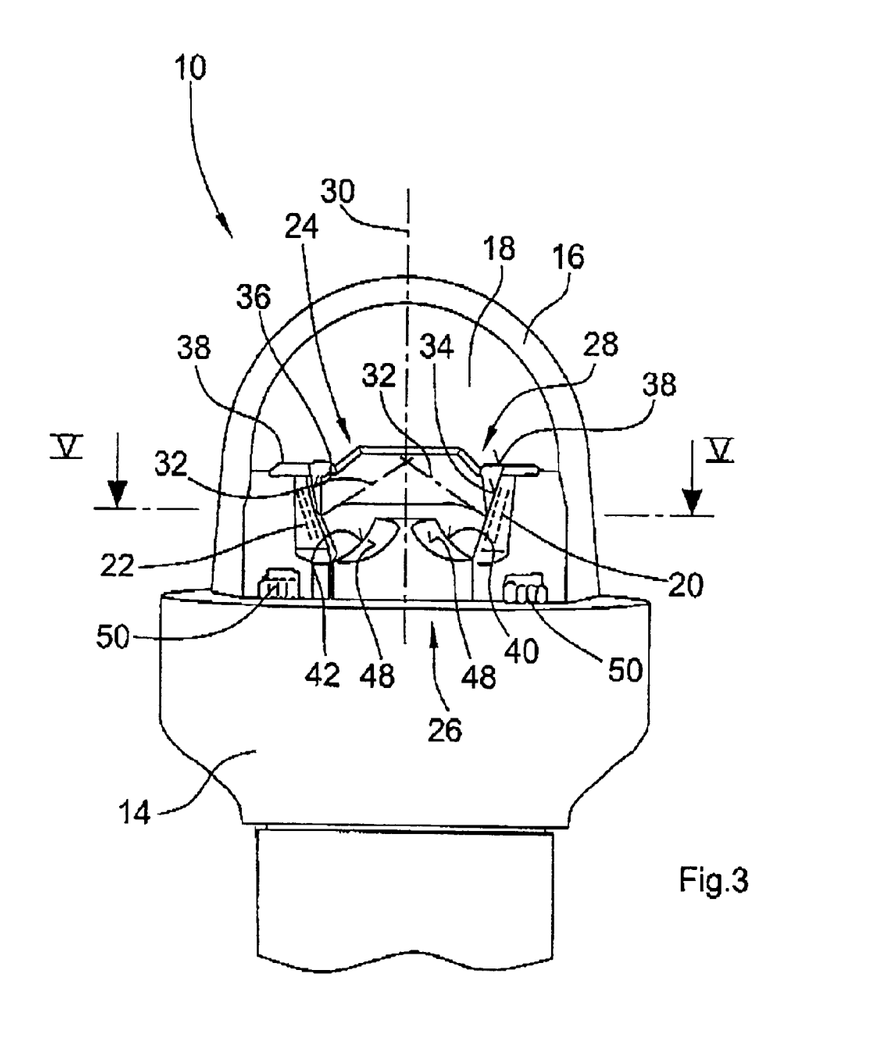
FIG. 3 is a side view of the housing of the position light radiating light.
Figure 4:
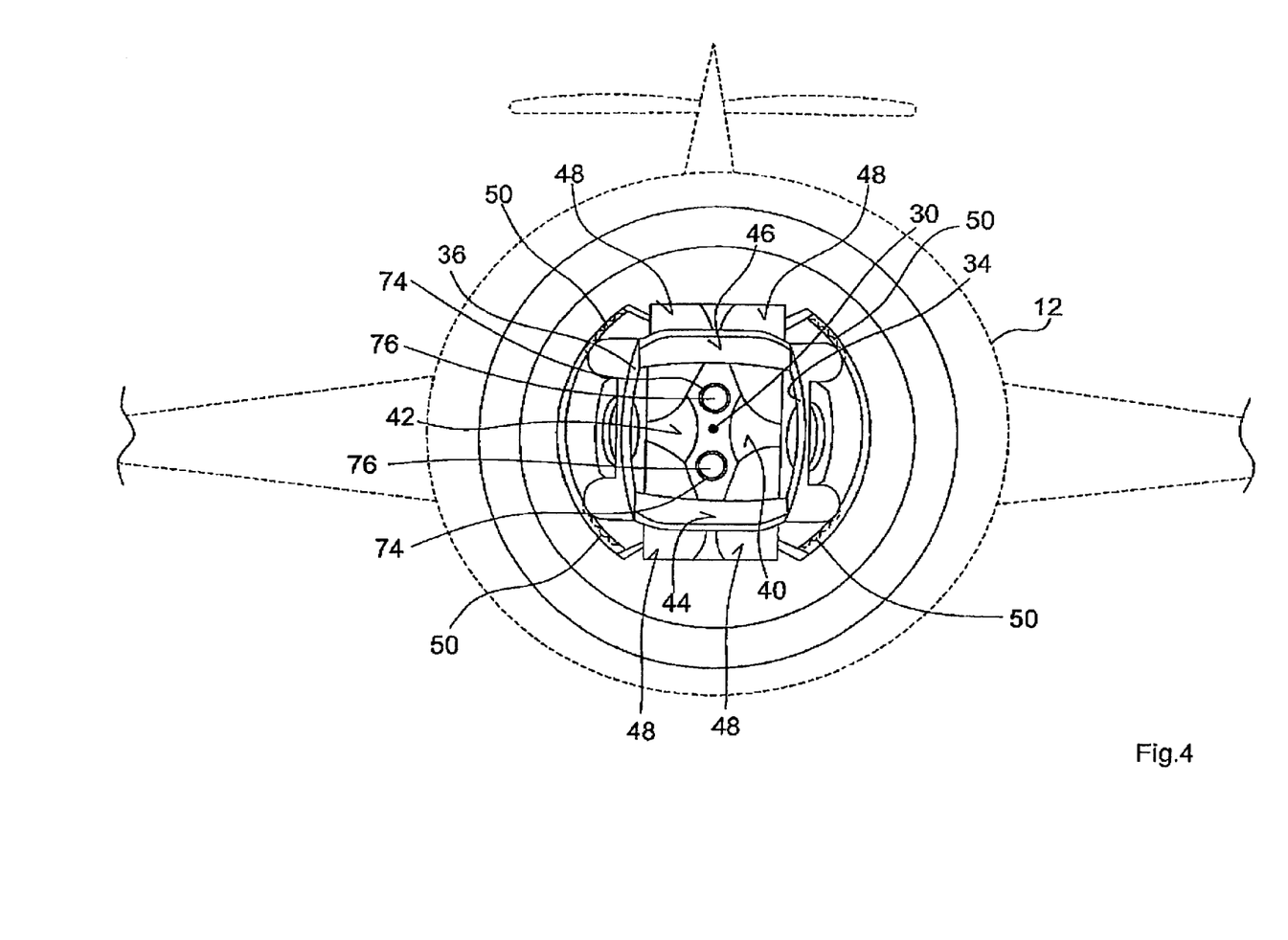
FIG. 4 is a top view of the position light after installation wherein the contours of the airplane are indicated in dotted lines.

In order to clarify the location of a position light 10 according to the invention, FIGS. 1 and 2 illustrate a side view and a top view of an airplane 12. Further, these Figures show diagrams for the vertical (FIG. 1) and for the horizontal (FIG. 2) distribution of the light emitted by the position light 10. In these diagrams, those ranges above or within which the vertical and horizontal light distributions have to be located according to an international standardization and standard taken as an example here are indicated by dotted lines. The standard says, for example, that the position light 10 must have a luminous intensity of about four candela at an angle of 50° in vertical extension and is allowed to have five candela at the most, for example, at an angle of 80° in horizontal extension (at respectively predetermined distances). The diagrams of FIGS. 1 and 2 show the actually measured luminous intensity distribution of the position light 10 in dotted lines.

The more definite construction of the position light 10 and its location and orientation relative to the airplane 12 is illustrated in FIGS. 3 to 6. According to these Figures, the position light 10 includes a housing 14, only a portion of which is illustrated in the Figures. The illustrated end of the housing 14 has a transparent dome-like cover 16 set thereupon which defines a receiving room 18. In this receiving room 18, two LED modules 20,22 and a reflector arrangement 24 are housed. The reflector arrangement includes two separate reflector bodies 26,28 in this embodiment. It is possible, of course, to provide less or more reflector bodies. Decisive for the invention is the arrangement of the reflection surfaces of the reflector arrangement 24 which will be described in detail further below.

As can be seen from the horizontal and vertical light distribution curves according to FIGS. 1 and 2, the standards require that the respective minimum requirements are up to a maximum at an angle of 0° both in vertical and horizontal extension, i.e., at an elevation angle and an azimuth angle of 0°. The 0° axis, which is the elongation of the longitudinal axis of the airplane 12, is also called preferential axis 30 hereinafter.

The respective optical elements decisive for the light distribution, i.e., the LED modules 20,22 and the reflector arrangement 24, are positioned in the receiving room 18 relative to this preferential axis 30. Thus, the two LED modules 20,22 are configured to be inclined with respect to the preferential axis 30 in such a manner that their normal lines 32 cross the preferential axis 30. Thus, the two LED modules 20,22 are arranged point-symmetrically to the preferential axis 30. From FIG. 4, it can be seen that the two LED modules 20,22 are arranged along the horizontal extension.

Figure 5:
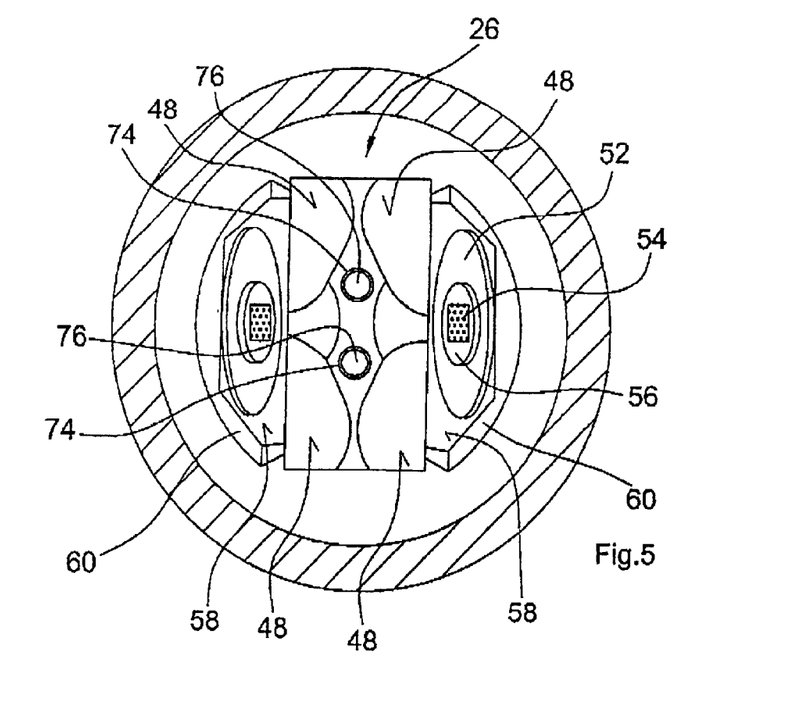
FIG. 5 is a sectional view along line V—V of FIG. 3.
Figure 7:
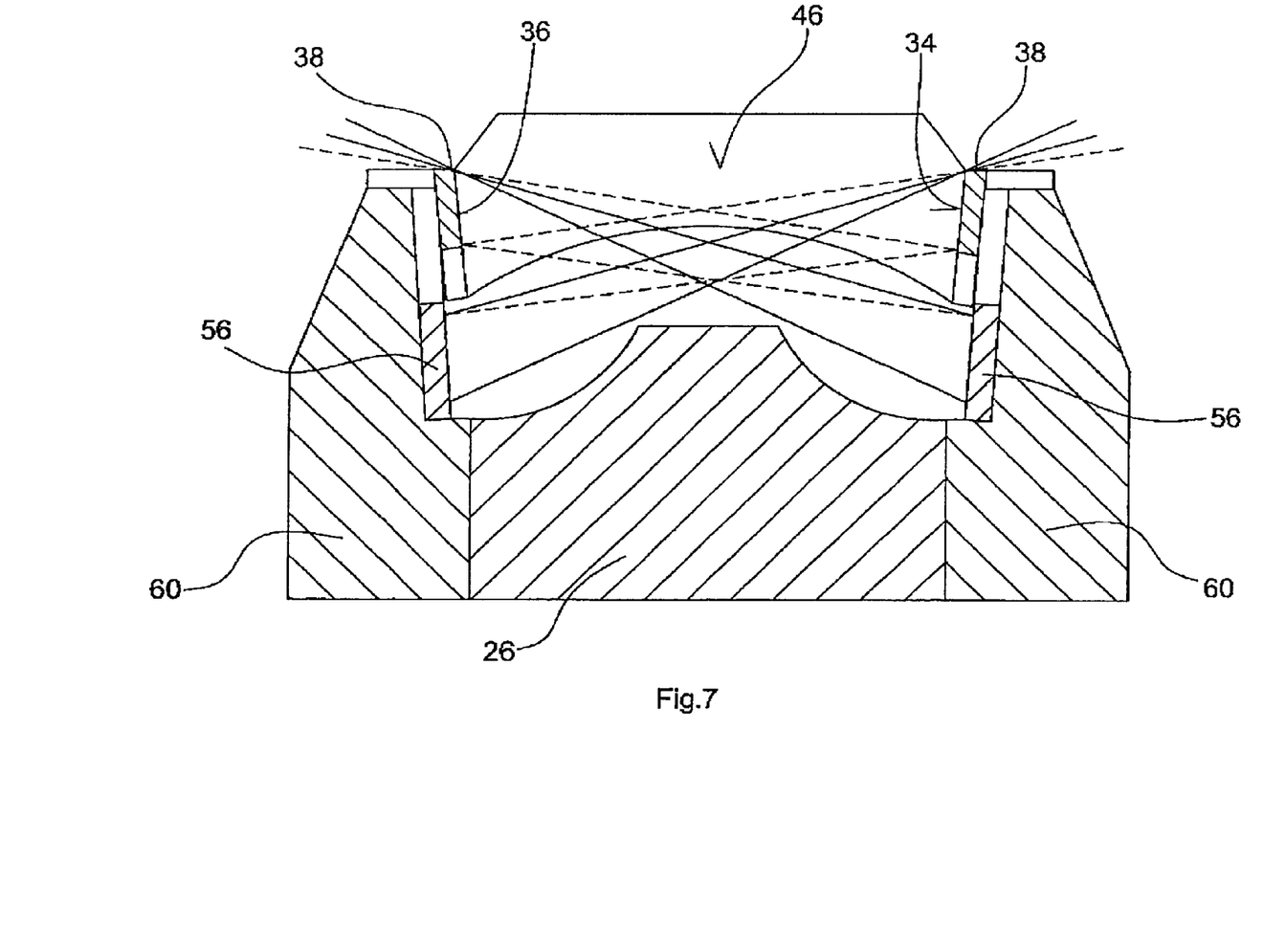
FIG. 7 is a cross-sectional view of a part of the light-emitting end of the position light to clarify the course of the light beams relevant for a partial range of the horizontal light distribution.

The first reflector body 26 comprising a plurality of different reflection surfaces according to FIG. 5 is located between the two LED modules 20,22. These reflection surfaces will be described further below. The other reflector body 28 being configured in the way of an annular structure and includes first and second reflection surfaces 34,36 arranged above and adjacent to the LED modules 20,22, respectively. is located above the LED modules 20,22. In propagation direction of the light of the position light 10, these reflection surfaces 34,36 end at light propagation limiting edges 38 generating the required light/dark border with respect to the horizontal light distribution according to FIG. 2 at an azimuth angle of about 70°, which is also illustrated in FIG. 7. Referring to FIG. 7, it can be seen that the edges 38 block the light directly emitted by the respectively opposite LED module 20,22 above an azimuth angle of about 70°. Since, however, the light efficiency of the LED modules 20,22 is not sufficient in the range of 70° to achieve the required minimum intensity, additional light must be provided in this solid angle range. This is effected by the fact that light of the (second) LED module 22, for example, is reflected by the reflection surface 34 opposite to this LED module 22, this reflected light radiating past the light propagation limiting edge 38 of the reflection surface 36. Thus, the luminous intensity is intensified within the solid angle ranges defined by the light propagation limiting edges 38. Since these solid angle ranges correspond to an azimuth angle of about 70°, the light/dark requirement can be satisfied here, even if each LED module 20,22 for itself cannot do this.

As can be seen from the illustrations, the two reflection surfaces 34,36 are also point-symmetrical to the preferential axis 30, these two reflection surfaces 34,36 follow each other in horizontal extension as well.

Finally, a third and a fourth reflection surface 40,42 are configured on the first reflector body 26. These two reflection surfaces 40,42 are arranged in immediate adjacency to their LED modules 20 and 22, respectively, which are allocated thereto, and ensure that the light emitted by these two LED modules is substantially reflected in the direction of the preferential axis 30.

Further, the reflector body 28 comprises fifth and sixth reflection surfaces 44,46 which are also arranged point-symmetrically to the preferential axis 30, opposite to each other and are arranged so as to be turned by 90° relative to the first and second reflection surfaces 34,36. These fifth and sixth reflection surfaces 44,46 reflect light emitted by both LED modules 20,22 within a solid angle range arranged closely about the preferential axis 30 to satisfy particularly the minimum intensity requirements of the vertical luminous intensity distribution in the range between about 10° and 70°.

Finally, the (first) reflector body 26 comprises four seventh reflection surfaces 48 that are arranged point-symmetrically to the preferential axis 30. These four seventh reflection surfaces 48 at least extend partially to below the fifth and sixth reflection surfaces 44,46 and particularly ensure that the requirements as to the minimum intensity valid in the ranges near 90° with respect to the vertical light distribution are satisfied. Therefore, these four reflection surfaces 48 are arranged so as to extend vertically or curved and are arranged in such a manner that sufficient light can be radiated in the vertical direction near 90°. If this light should eventually be insufficient, additional LED elements 50 are provided. These elements 50 are arranged in four groups, the groups being arranged so as to be diametrically opposed to each other. Each group may have one or more LED elements 50. These LED elements 50 radiate light substantially at 90° in vertical direction (with respect to the vertical luminous intensity distribution).

Figure 6:
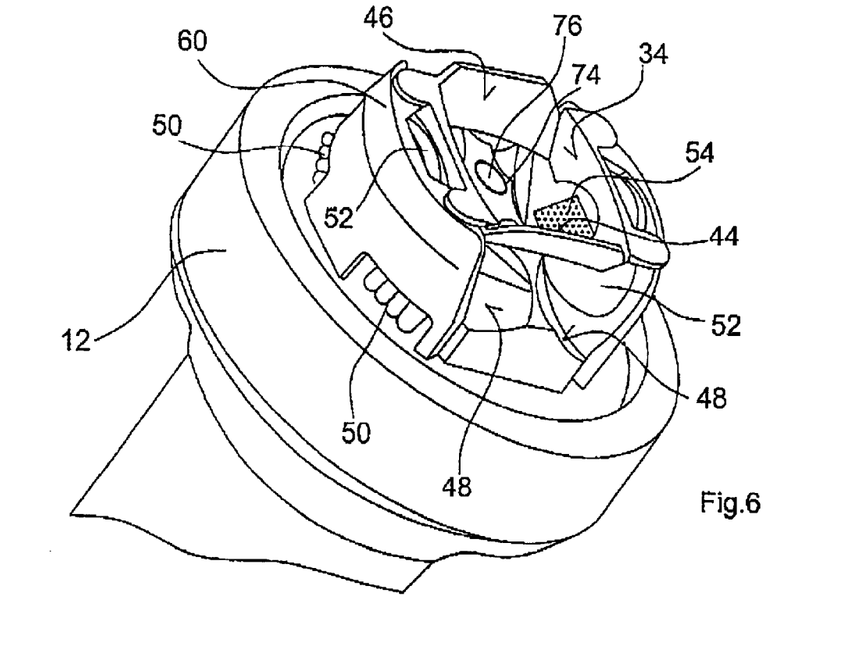
FIG. 6 is a perspective view of the light-emitting end of the position light.

As is particularly apparent from FIGS. 5 and 6, the LED modules 20,22 are carrier plates 52 on which a plurality of single LED elements 54 are arranged in rows and columns. The array of single LED elements 54 is coated by a casting compound 56 which may have an optical function, but not necessarily so. Each carrier plate 52 is arranged on an inclined surface 58 of a holding element 60, both holding elements 60 being arranged at both sides and on opposite sides of the first reflector body 26.

By the use of only two LED modules emitting their light, in contrast to incandescent lamps, only in a limited solid angle range of about 140° to 170°, the reflection surface arrangement described herein makes it possible to guarantee a luminous intensity distribution in horizontal and vertical direction which satisfies the legal and international requirements, respectively, which are assumed in this embodiment. For the luminous intensity distributions in the ranges 62 of the horizontal luminous intensity distribution (see FIG. 2), the first and second reflection surfaces 34,36 with their light propagation limiting edges 38 are responsible leading, in this embodiment, to an excessive luminous intensity at the required light/dark border at an azimuth angle of about 70°. Within the range 64 of the horizontal luminous intensity distribution, the light is really predominantly supplied via the third and fourth reflection surfaces 40,42. The fifth and sixth reflection surfaces 44,46 are primarily responsible for the luminous intensity in the ranges 66 of the horizontal luminous intensity distribution.

With reference to the vertical luminous intensity distribution, it applies that the luminous intensity in the central range 68 (see FIG. 1) is caused by the third and fourth reflection surfaces 40,42, since these reflection surfaces 40,42 reflect light substantially in the direction of the preferential axis 30, as with the horizontal luminous intensity distribution. The essential contribution to the light distribution in the ranges 70 of the vertical luminous intensity distribution adjacent to the central range 68 is made by the fifth and sixth reflection surfaces 44,46, while into the ranges 72 of the vertical luminous intensity distribution, light is primarily reflected via the four seventh reflection surfaces 48.

When the position light 10 is used for military aircraft for the identification friend-foe, two bores 74 are configured in the first reflector body 26 in each of which an IR light source 76 in the form of a LED or configured with another technology is arranged. These light sources emit electromagnetic radiation in the non-visible wavelength range, which, in turn, can be localized by night viewers. The radiation direction of the light sources for radiation in the non-visible wavelength range configured as IR sources 76 here substantially extends in the direction of the preferential axis 30.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A light, particularly a position light, for an aircraft, for being mounted to the rear end of an aircraft, the light comprising:

a luminous means for emitting light;

a reflector arrangement, and a housing comprising a receiving room for the luminous means and the reflector arrangement being covered by a transparent cover, the housing, the receiving room, the luminous means, and the reflector arrangement are configured such that light with a maximum intensity along a preferential axis emerges from the housing, wherein the luminous means comprises a first and a second light source which are substantially identical and respectively emit light within a light radiation solid angle having a central axis, the two light sources being arranged symmetrically to the preferential axis and the central axes of the light radiation solid angle being inclined so as to face each other, and that the reflector arrangement comprises a first and a second reflection surface allocated to the first and second light source, respectively, said reflection surfaces also being symmetrically arranged to the preferential axis and respectively provided with a light propagation limiting edge for limiting the light propagation range, within which light emitted directly by the respectively allocated light source emerges from the receiving room of the housing, the first reflection surface being arranged opposite to the first light source and the second reflection surface being arranged opposite to the second light source and the light propagation limiting edge of the first reflection surface facing away from the second light source and the light propagation limiting edge of the second reflection surface facing away from the first light source, and the two reflection surfaces being oriented and/or configured such that light emitted by the one light source is reflected by the reflection surface allocated thereto past the light propagation limiting edge of the other reflection surface to increase the luminous intensity within the light propagation range of the other light source near the partial range defined by the light propagation limiting edge of the one reflection surface.

2. The light according to claim 1, wherein the reflector arrangement comprises a third and a fourth reflection surface which are allocated to the first and second light source, respectively, and also arranged symmetrically to the preferential axis and between the first and the second reflection surface when seen in top view of the cover in the direction of the preferential axis and reflect the light emitted by the respectively allocated light source substantially in the direction of the preferential axis.

3. The light according to claim 2, wherein the reflector arrangement comprises a fifth and a sixth reflection surface also arranged symmetrically to the preferential axis and offset by 90° with respect to the first and the second reflection surface, and that the fifth and the sixth reflection surface reflect the light emitted by both light sources within a first solid angle range adjacent to the preferential axis.

4. The light according to claim 3, wherein the fifth and sixth reflection surfaces interconnect the first and second reflection surfaces.

5. The light according to claim 1, wherein the reflector arrangement comprises four seventh reflection surfaces which are diametrically opposed to each other in pairs and are arranged symmetrically to the preferential axis in pairs, that two seventh reflection surfaces are respectively allocated to one light source, and that the four seventh reflection surfaces reflect light of the light sources respectively allocated thereto within a second solid angle range spaced from the preferential axis.

6. The light according to claim 3, wherein the first solid angle range is located between the preferential axis and the second solid angle range.

7. The light according to claim 2, characterized in that wherein the third and fourth reflection surfaces as well as the four seventh reflection surfaces are configured as parts of the surface of a common first reflector body, which, in top view of the cover of the housing, viewed in the direction of the preferential axis, is arranged between the two light sources.

8. The light according to claim 1, wherein the first, the second, the fifth and the sixth reflection surface are configured as a second annular reflector body, which, in top view of the cover of the housing, viewed in the direction of the preferential axis, is arranged in front of the two light source.

9. The light according to claim 7, wherein in a top view of the cover of the housing, viewed in the direction of the preferential axis, the light sources are arranged behind the second reflector body and in front of the first reflector body.

10. The light according to claim 1, wherein each reflection surface has a curved, particularly concavely curved configuration.

11. The light according to claim 1, wherein each of the two light sources is configured as a light source comprising at least one LED element.

12. The light according to claim 11, wherein each light source is configured as an LED module with a plurality of LED elements arranged in the form of a matrix or a lattice.

13. The light according to claim 1, wherein further light sources are arranged in such a manner that they emit their light under an angle of substantially 90° to the preferential axis.

14. The light according to claim 13, wherein the further light sources comprise at least one LED element each.

15. The light according to claim 1, further comprising additional radiation sources emitting electromagnetic radiation in the non-visible wavelength range and being arranged in such a manner that they emit their radiation substantially in the direction of the preferential axis, these radiation sources being adapted to be optionally driven to supply the radiation pulsatingly, intermittently and/or continuously.

16. The light according to claim 15, wherein each additional radiation source is configured as LED element, particularly as IR-LED element.

17. A light comprising:
a housing;
a first and second light source being arranged symmetrically and on opposite sides of the housing so as to each emit light that propagates away from the housing, the light being emitted by the first light source intersecting the light being emitted by the second light source; and
a first and second reflector being arranged on opposite sides of the housing for reflecting a portion of the light emitted by the first and second light sources, respectively, the first reflector reflecting light into a light angle of the second light source so as to increase a luminous intensity of the light emitted by the second light source and the second reflector reflecting light into a light angle of the first light source so as to increase a luminous intensity of the light emitted by the first light source.

18. The light according to claim 17, further comprising a first and second limiting edge for limiting an angle of the emitted light emitted by the first and second light source, respectively.

* * * * *